(No Model.)

E. HUMPHREYS.
LUBRICATOR.

No. 423,057. Patented Mar. 11, 1890.

Witnesses
Louis G. Julihn
C. P. Elwell

Inventor
Edward Humphreys
By Hopkins and Aitken
His Attorneys

UNITED STATES PATENT OFFICE.

EDWARD HUMPHREYS, OF WILLIAMSPORT, PENNSYLVANIA.

LUBRICATOR.

SPECIFICATION forming part of Letters Patent No. 423,057, dated March 11, 1890.

Application filed January 7, 1890. Serial No. 336,189. (No model.)

*To all whom it may concern:*

Be it known that I, EDWARD HUMPHREYS, of Williamsport, in the county of Lycoming and State of Pennsylvania, have invented a certain new and useful Improvement in Lubricators, of which the following is a specification, reference being had to the accompanying drawings.

The object of my invention is to provide a lubricator which will supply oil to the bearing parts of a wheel and axle in sufficient quantity, and distribute it freely and smoothly upon the axle without any tendency to scratch or otherwise injure the latter.

My invention belongs to the class in which a reservoir of oil is carried upon a hub of a wheel, for instance. A duct connects the reservoir with the parts to be lubricated, and means of controlling the flow of oil in the reservoir through the duct is provided in the duct.

Heretofore in lubricators of this class a loose pin or its equivalent has been used to act partially as a valve to prevent the too free escape of the oil at certain times, and also as a plunger or piston to increase the feed of the oil at certain points in the revolution of the wheel. An objection to these is that unless they are made very smooth they tend to scratch the axle and they do not spread the oil upon the axle.

My improvement consists in providing within the duct which leads from the reservoir to the bearing parts a ball of a size slightly smaller than the bore of the duct, so that it may move freely through the entire length of the duct from the reservoir to the axle and back again. By the use of the ball I prevent any possibility of injuring the axle, because the ball is not only provided with a smooth surface, but, being rotatable in the end of the duct, it opposes no resistance to the free revolution of the wheel upon the axle. By such revolution all parts of the ball which are covered with oil may be rubbed against the surface of the axle, and so distribute the oil upon it, while the size of the ball prevents the too free escape of oil, which would be objectionable.

Figure 1:
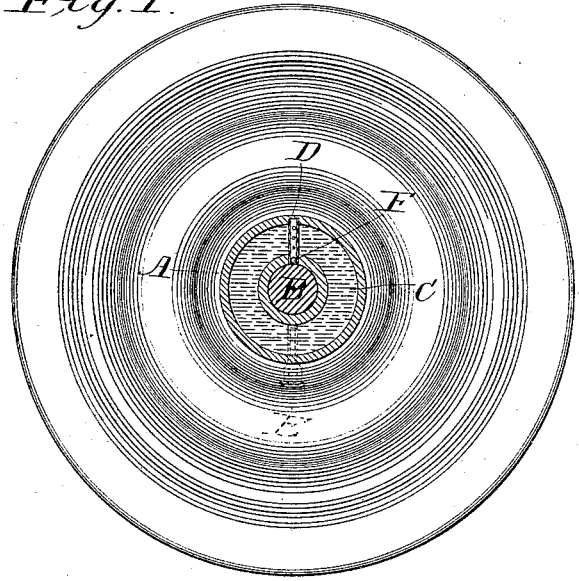
Figure 2:
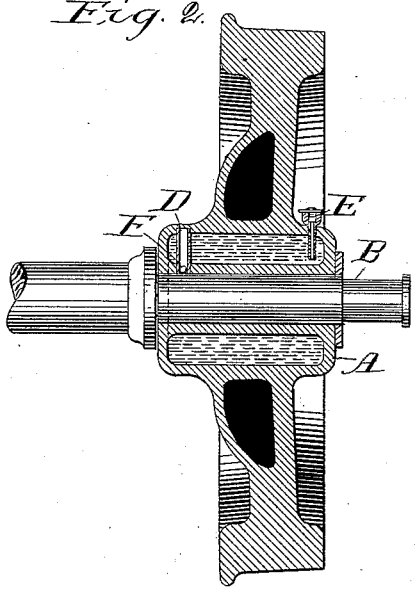
Figure 3:
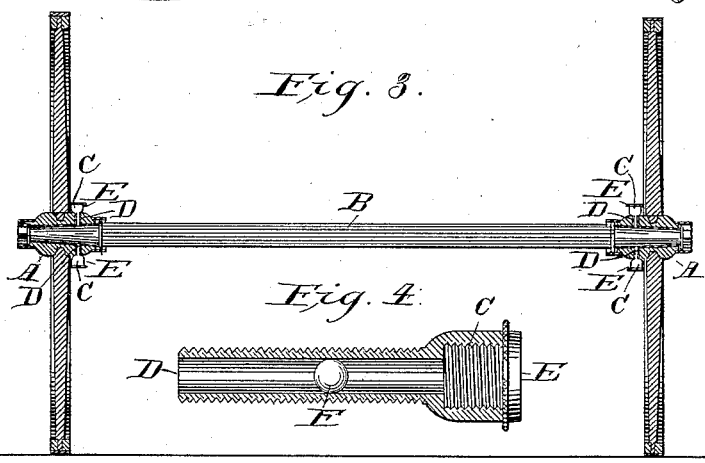
Figure 4:
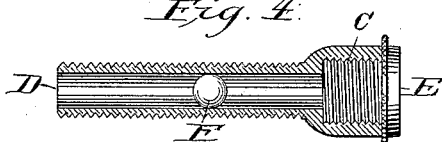
Figure 5:
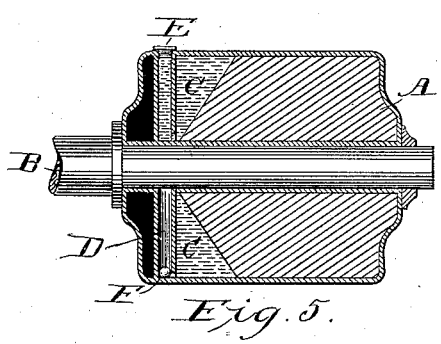
Figure 6:
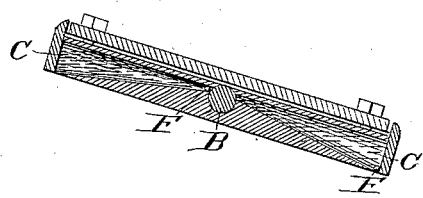

In the accompanying drawings, Figure 1 is a side elevation of a car-wheel with the hub in section, showing an annular lubricator surrounding the axle. Fig. 2 is a central section of a car-wheel provided with an annular lubricator located inside the hub. Fig. 3 is a central vertical section of two wheels and their axle, each of the wheels being provided with tubular lubricators. Fig. 4 is a central section of my lubricator in its simplest form. Fig. 5 is a central section through the hub of a car-wheel supplied with a modified form of my lubricator, and Fig. 6 is a central section of my lubricator as applied to a rocking shaft.

Referring to the letters upon the drawings, A indicates the hub of a wheel, and B the axle.

C indicates the reservoir, which may be an annular space surrounding the hub, as shown in Figs. 1, 2, and 5, and connected by the tube D with the axle; or it may be an enlargement of the tube D, as shown in Figs. 3 and 4.

E indicates a cap to the reservoir, and is adapted to be secured thereto by screw-threads or other convenient means.

The tube D is fitted with a ball F, so as to allow the latter to travel loosely in it.

When tubes are used, I prefer to use two, located opposite each other, so that when one is uppermost the other will be beneath.

In Fig. 6 is illustrated means for applying my lubricator to a rocking shaft. In this the reservoir may be located at any convenient place and the balls travel in inclined canals, so that at each oscillation of the rocking beam one of the balls travels from the oil to the axle and the other slips back into the reservoir.

I am aware that ball-valves have been used in connection with lubricators; but I am not aware that a ball traveling completely through a channel connecting the oil-reservoir with the axle has been used.

What I claim is—

The combination, with a reservoir fastened to the wheel, of a tube connecting the reservoir with the axle and a ball whose diameter is slightly less than that of the tube and which is adapted to reciprocate within the tube to and from the axle, substantially as set forth.

In testimony of all which I have hereunto subscribed my name.

EDWARD HUMPHREYS.

Witnesses:
J. ALBERT WOOD,
JNO. R. BIXLER.